US012394790B2

(12) United States Patent
De Palma et al.

(10) Patent No.: US 12,394,790 B2
(45) Date of Patent: Aug. 19, 2025

(54) METHOD FOR PREPARING A POSITIVE ELECTRODE MATERIAL FOR RECHARGEABLE LITHIUM ION BATTERIES

(71) Applicant: UMICORE, Brussels (BE)

(72) Inventors: Randy De Palma, Brussels (BE); Kasper Lambrighs, Brussels (BE); Dae-Hyun Kim, Chungcheongnam-do (KR); HyeJeong Yang, Chungcheongnam-do (KR)

(73) Assignee: UMICORE, Brussels (BE)

( * ) Notice: Subject to any disclaimer, the term of this patent is extended or adjusted under 35 U.S.C. 154(b) by 946 days.

(21) Appl. No.: 17/605,288

(22) PCT Filed: Apr. 24, 2020

(86) PCT No.: PCT/EP2020/061430
§ 371 (c)(1),
(2) Date: Oct. 21, 2021

(87) PCT Pub. No.: WO2020/216888
PCT Pub. Date: Oct. 29, 2020

(65) Prior Publication Data
US 2022/0190334 A1    Jun. 16, 2022

(30) Foreign Application Priority Data
Apr. 26, 2019   (EP) .................... 19171244

(51) Int. Cl.
*H01M 4/525*   (2010.01)
*C01G 53/50*   (2025.01)
*H01M 4/04*    (2006.01)
*H01M 4/505*   (2010.01)
*H01M 10/0525* (2010.01)
*H01M 4/02*    (2006.01)

(52) U.S. Cl.
CPC ............ *H01M 4/525* (2013.01); *C01G 53/50* (2013.01); *H01M 4/0471* (2013.01); *H01M 4/505* (2013.01); *H01M 10/0525* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| 2009/0299922 A1 | 12/2009 | Malcus et al. |
| 2013/0011726 A1 | 1/2013 | Shoji et al. |
| 2018/0351174 A1 | 12/2018 | Paulsen et al. |

FOREIGN PATENT DOCUMENTS

| EP | 2523240 A1 | 11/2012 | |
| JP | 2002187722 A | 7/2002 | |
| JP | 2008544468 A | 12/2008 | |
| JP | 2012023015 A | 2/2012 | |
| JP | 2016139569 A | 8/2016 | |
| JP | 2017182927 A | 10/2017 | |
| JP | 2018529195 A | 10/2018 | |
| WO | WO-0029331 A1 * | 5/2000 | ............... C01G 1/02 |
| WO | 2007000286 A1 | 1/2007 | |
| WO | 2017042654 A1 | 3/2017 | |

OTHER PUBLICATIONS

English translation of JP2017182927 (Year: 2017).*
ISA/EP; International Search Report and Written Opinion for International Patent Application No. PCT/EP2020/061430 dated Jul. 24, 2020, 9 pages.
JPO; Office Action for Japanese Patent Application No. 2021-563334 dated Nov. 7, 2022, 5 pages.

* cited by examiner

*Primary Examiner* — Tanisha Diggs
(74) *Attorney, Agent, or Firm* — NK Patent Law

(57) ABSTRACT

This invention relates to a process for manufacturing lithium nickel cobalt oxide-based cathode compounds for lithium ion secondary batteries. As part of this process, nickel, cobalt, and optionally manganese-bearing precursor compounds are lithiated and sintered at a high temperature. When cooled down, a high cooling rate will benefit the throughput of the process and the economics. It has however been found that the cooling rate should not exceed 10° C./min in what has been determined to be a critical temperature domain, ranging from 700° C. to 550° C.

12 Claims, No Drawings

METHOD FOR PREPARING A POSITIVE ELECTRODE MATERIAL FOR RECHARGEABLE LITHIUM ION BATTERIES

CROSS-REFERENCE TO RELATED APPLICATIONS

This application is a U.S. National Stage application of International Patent Application No. PCT/EP2020/061430, filed on Apr. 24, 2020, which claims the benefit of European Patent Application No. 19171244.7, filed on Apr. 26, 2019.

TECHNICAL FIELD

This invention relates to a process for manufacturing a lithium nickel cobalt oxide based positive electrode compounds for a secondary lithium-ion battery with lower cost and improved energy efficiency of the production process. Manganese and/or aluminium is optionally included. These compounds are hereafter referred to as N(M)C.

BACKGROUND

N(M)C based positive electrode materials are generally prepared by solid state reactions between transition metal bearing precursors such as metal hydroxides, and a lithium source such as lithium carbonate or lithium hydroxide, in an oxidizing atmosphere. A general process comprises blending, thermal treatment, milling, and screening, as disclosed for instance in the patent publication WO 2017/042654 A1.

A main throughput bottleneck in the manufacturing process of N(M)C is the thermal treatment. This comprises heating, sintering, and cooling steps. The mixture of transition metal bearing precursors and the lithium source are slowly heated to a target sintering temperature, generally in the range between 650° C. and 1050° C. After the sintering process step, the sintered product is generally allowed to cool down naturally to ensure thermal uniformity throughout the volume of the product. E.g., EP 3 054 508 A1 describes in Example 1 a post-sintering, natural cooling profile from 750° C. to 200° C. in 5 hours.

After the mixture reaches the target sintering temperature, it stays at that temperature for 10 to 20 hours. The sintering time should be long enough to allow the reaction of the precursors to complete and to growth of primary particles to proceed to the desired size. The blending, milling, and screening steps require each less than half an hour. Consequently, the cooling step constitutes a large portion of the total production time of the heat treatment process.

It is an object of the present invention to provide a more economical, energy-efficient, commercially viable production process for N(M)C positive electrode materials without scarifying electrochemical property.

SUMMARY OF THE INVENTION

The current invention provides in a solution for at least one of the above mentioned problems by providing a process for preparing a cathode active material, as described in claim 1. Advantageously, the present invention allows for a high throughput production of cathode active battery materials, in an energy-economical, environmentally friendly manner.

DESCRIPTION OF THE INVENTION

Multiple Stage Cooling Process

To this end, the acceleration of the cooling step is envisaged. In a first aspect, the present invention provides a process for preparing a positive electrode material for lithium-ion batteries. In particular, the present invention provides a process for preparing a positive electrode material for lithium-ion batteries comprising the steps of:

subjecting a mixed metal compound pM comprising nickel and at least one metal selected from cobalt, manganese and aluminium to a heat treatment at a temperature $T_S$ of at least 650° C., thereby obtaining a heat-treated mixed metal compound M;

in a first cooling stage, cooling said heat-treated mixed metal compound M to an intermediate temperature $T_I$ being the lower of 700° C. and the sintering temperature $T_S$;

in a second cooling stage, cooling said heat-treated mixed metal compound M from said intermediate temperature $T_I$ to 550° C. at a mean cooling rate of more than 2° C./min and of less than 10° C./min; and in a final cooling stage, cooling said heat-treated mixed metal compound M to ambient temperature, thereby obtaining a positive electrode material for lithium-ion batteries.

Preferably, said mixed metal compound pM comprises a lithiated precursor having a general formula of $Li_{1+a}M'_{1-a}O_2$, wherein $-0.03 \leq a \leq 0.25$, and $M'=Ni_x M''_y Co_z E_d$, wherein $0.15 \leq x \leq 0.95$, $0.00 \leq y \leq 0.80$, $0.05 \leq z \leq 0.40$, and $0.00 \leq d \leq 0.10$, with M" being either one or both of Mn or Al, and with E being a dopant selected from Ba, Al, Ti, Zr, W, Fe, Cr, Mo, Nb, Mg and V. Preferably, said heat treatment comprises heating said lithiated precursor by heating to a sintering temperature $T_S$ of at least 650° C., thereby obtaining a sintered precursor.

Advantageously, the present inventors have found that electrochemical properties of the positive electrode battery material are not negatively affected provided that the heat-treated mixed metal compound M, such as e.g. a sintered precursor, is cooled from the temperature of the heat treatment to 550° C. at a mean cooling rate of at most 10° C./min. Preferably, the mean cooling rate is at least 2° C./min to ensure fast processing. The present inventors have also found that the electrochemical properties of the positive electrode active material obtained by the process are not negatively affected by the further cooling trajectory once the heat-treated mixed metal compound M, such as e.g. a sintered precursor, has a temperature of 550° C. or lower. This means that higher cooling rates are preferred once the temperature of the heat-treated compound is below 550° C., in order to ensure fast processing.

In a preferred embodiment, the present invention provides a process according to the first aspect of the invention, whereby the cooling rate at any time of said second cooling stage is substantially constant, meaning that said cooling rate is at any time of said second cooling stage ±25% of said mean cooling rate during said second cooling stage. Preferably, said cooling rate is at any time of said second cooling stage ±15% of said mean cooling rate and more preferably ±10% or even ±5% of said mean cooling rate.

In a preferred embodiment, the present invention provides a process according to the first aspect of the invention, whereby said mixed metal compound pM is subjected to a heat treatment at a temperature $T_S$ between 700° C. and 1200° C., preferably between 750° C. and 1050° C. Preferably, said mixed metal compound pM is subjected to a heat treatment at a temperature $T_S$ of 750° C., 800° C., 850° C., 900° C., 950° C., or 1000° C., or any temperature there in between. Preferably, said mixed metal compound is subjected to a heat treatment at a temperature $T_S$ for a period of 0.1 hours to 24 hours, and preferably of 0.25 hours to 10 hours. More preferably, said mixed metal compound pM is subjected to said heat treatment for a period of 1 hour to 6 hours, and most preferably for a period of 1 hour to 3 hours. Preferably, said mixed metal compound pM comprises a lithiated precursor. Preferably, said heat treatment comprises a sintering process.

In a preferred embodiment, the present invention provides a process according to the first aspect of the invention, wherein the second cooling stage is performed at a mean cooling rate of less than 10° C./min as measured during any 1-minute interval, preferably at a mean cooling rate of between 2° C./min and 10° C./min, more preferably between 2.5° C./min and 10° C./min, more preferably between 3.0° C./min and 10° C./min, even more preferably between 3.5° C./min and 10° C./min and most preferably between 4° C./min and 10° C./min, or even at a mean cooling rate between 5° C./min and 10° C./min.

In a preferred embodiment, the present invention provides a process according to the first aspect of the invention, wherein the second cooling stage is performed at an instantaneous cooling rate of less than 10° C./min, preferably at an instantaneous cooling rate of between 2° C./min and 10° C./min, more preferably between 2.5° C./min and 10° C./min, more preferably between 3.0° C./min and 10° C./min, even more preferably between 3.5° C./min and 10° C./min and most preferably between 4° C./min and 10° C./min.

In a preferred embodiment, the present invention provides a process according to the first aspect of the invention, whereby said heat treatment further comprises a third cooling stage, whereby said heat-treated mixed metal compound M, such as e.g. a sintered precursor, is cooled from a temperature between 550° C. and 400° C. to a temperature between 250° C. and 100° C. at a mean cooling rate of at least 4° C./min, preferably at least 10° C./min and more preferably 20° C./min to 120° C./min. Preferably, said heat-treated mixed metal compound M, such as e.g. a sintered precursor, is cooled from about 550° C. to about 200° C.

In a more preferred embodiment, the present invention provides a process according to the first aspect of the invention, whereby said heat-treated mixed metal compound M, such as e.g. a sintered precursor, is cooled in said third cooling stage at a mean cooling rate equal to or higher than the mean cooling rate in said second cooling stage.

In a more preferred embodiment, the present invention provides a process according to the first aspect of the invention, whereby said heat-treated mixed metal compound M, such as e.g. a sintered precursor, is cooled in said third cooling stage at a mean cooling rate of at least 10° C./min, preferably at a cooling rate from 20° C./min to 120° C./min.

In a preferred embodiment, the present invention provides a process according to the first aspect of the invention, whereby $-0.03 \leq a \leq 0.10$.

In a preferred embodiment, the present invention provides a process according to the first aspect of the invention, whereby $0.60 \leq x \leq 0.95$, preferably whereby $0.60 \leq x \leq 0.92$, and more preferably whereby $x=0.65$, $x=0.70$, $x=0.75$, $x=0.80$, $x=0.85$, or $x=0.90$, or any value there in between.

Mixed Metal Compound pM

In one embodiment, the present invention provides a process according to the first aspect of the invention, whereby said mixed metal compound pM is provided in the form of a granular material such as powders or in the form of pellets having a dimension of 0.5 mm to 10.0 mm, preferably from 1.0 mm to 5.0 mm.

In a preferred embodiment, the present invention provides a process according to the first aspect of the invention, whereby said mixed metal compound pM is comprised of a particulate material with a median particle size d50 of at most 100 µm, as determined by laser particle size distribution measurement method, preferably at most 50 µm, more preferably between 0.5 µm to 25.0 µm and most preferably between 1 µm and 15 µm. In one preferred embodiment of the present invention, the mean particle diameter (d50) of said mixed metal compound pM is in the range of from 4 to 14 µm, preferably between 7 and 10 µm. The median particle size (PD50 or d50) of the compound is obtained by a laser particle size distribution measurement method. In this description, the laser particle size distribution is measured using a Malvern Mastersizer 2000 with Hydro 2000MU wet dispersion accessory, after dispersing the powder in an aqueous medium. In order to improve the dispersion of the powder in the aqueous medium, sufficient ultrasonic irradiation, typically 1 minute for an ultrasonic displacement of 12, and stirring, are applied and an appropriate surfactant is introduced.

In a preferred embodiment, the present invention provides a process according to the first aspect of the invention, whereby said mixed metal compound pM is comprised of a particulate material and is provided with an apparent density higher than 0.4 g/cm³, preferably with a density higher than 0.6 g/cm³, preferably with a density higher than 0.8 g/cm³, preferably with a density higher than 1.0 g/cm³, preferably with a density higher than 1.4 g/cm³, and even higher than 1.5 g/cm³. Preferably, said mixed metal compound pM is comprised of a particulate material and is provided with a density less than 2.3 g/cm³, preferably with a density less than 2.1 g/cm³, and even less than 2.0 g/cm³.

The present invention provides a process according to the first aspect of the invention, whereby said mixed metal compound pM comprises nickel and at least one metal selected from cobalt, manganese and aluminium. In a preferred embodiment, said mixed metal compound pM comprises Ni in an amount of at least 50 mol. %, relative to the total content of nickel, cobalt, manganese and aluminium in said mixed metal compound pM, preferably at least 60 mol. % and more preferably in an amount of 60 mol. % to 99 mol. %. Most preferably, said mixed metal compound pM comprises Ni in an amount of 60 mol. % to 95 mol. %, and even more preferably in an amount of 80 mol. % to 95 mol. %, such as 80 mol. %, 85 mol. %, 90 mol. % and 95 mol. %, and all values there in between.

In a preferred embodiment, the present invention provides a process according to the first aspect of the invention, whereby said mixed metal compound pM comprises a mixed metal hydroxide, carbonate, oxyhydroxide and/or oxide, and wherein said mixed metal compound pM preferably further comprises one or more metals selected from Ba, Al, Ti, Zr, W, Fe, Cr, Mo, Nb, Mg and V, more preferably from Al, Ti, Zr, W and Mg.

In one preferred embodiment of the present invention, said mixed metal compound pM comprises Ni, Co and Al. In another preferred embodiment of the present invention, said mixed metal compound pM comprises Ni, Co and Mn.

In a preferred embodiment of the present invention, said mixed metal compound pM is according to general formula (I), the counterion(s) being omitted for clarity:

$$Ni_xM''_yCo_zE_d \qquad (I)$$

wherein x is in the range of from 0.15 to 0.95, preferably from 0.30 to 0.92, more preferably from 0.50 to 0.90, and most preferably from 0.60 to 0.85; wherein y is in the range of from 0.00 to 0.80, preferably from 0.01 to 0.60, and more preferably from 0.05 to 0.20; wherein z is in the range of from 0.00 to 0.40, preferably from 0.01 to 0.30, preferably from 0.02 to 0.10; and wherein d is in the range of from 0.00 to 0.10, preferably from 0.001 to 0.005; wherein with M" is one or both of Mn or Al; and wherein E is selected from Ba, Al, Ti, Zr, W, Fe, Cr, K, Mo, Nb, Sr, Mg, Na and V, including combinations thereof, preferably selected from Ba, Al, Ti, Zr, W, Fe, Cr, Mo, Nb, Sr, Mg and V; and wherein x+y+z+d=1, and wherein y+z+d≥0.05, preferably y+z+d≥0.08, and more preferably y+z+d≥0.10. Preferably, E is selected from Al, Mg, W, Ti and Zr and combinations thereof, and more preferably E is selected from Al, Mg and Zr and combinations thereof.

Preferred examples of mixed metal compounds pM according to general formula (I) are selected from $Ni_{1/3}Co_{1/3}Mn_{1/3}$, $Ni_{0.4}Co_{0.2}Mn_{0.4}$, $Ni_{0.5}Co_{0.2}Mn_{0.3}$, $Ni_{0.6}Co_{0.2}Mn_{0.2}$, $(Ni_{0.85}Co_{0.15})_{0.98}Al_{0.02}$, $(Ni_{0.85}Co_{0.15})_{0.97}Al_{0.03}$, $(Ni_{0.85}Co_{0.15})_{0.95}Al_{0.05}$, $Ni_{0.8}Co_{0.1}Mn_{0.1}$, and $Ni_{0.7}Co_{0.2}Mn_{0.1}$, $Ni_{0.2}Co_{0.1}Mn_{0.7}$, $Ni_{0.25}Co_{0.15}Mn_{0.6}$, $(Ni_{0.6}Co_{0.2}Mn_{0.2})_{0.997}Al_{0.003}$, $(Ni_{0.6}Co_{0.2}Mn_{0.2})_{0.998}Al_{0.002}$, $(Ni_{0.7}Co_{0.2}Mn_{0.1})_{0.997}Al_{0.003}$, $(Ni_{0.7}Co_{0.2}Mn_{0.1})_{0.998}Al_{0.002}$, $(Ni_{0.8}Co_{0.1}Mn_{0.1})_{0.997}Al_{0.003}$, $(Ni_{0.8}Co_{0.1}Mn_{0.1})_{0.998}Al_{0.002}$.

Said mixed metal compound pM may contain traces of other metal ions, for example traces of ubiquitous metals such as Na, Ca or Zn, although such traces will not be taken into account in the description of the present invention. The term 'traces' in the context of the present invention refers to amounts of 0.05 mol. % or less, relative to the total metal content of said mixed metal compound pM.

Said mixed metal compound pM may be a monocrystalline product or may be a polycrystalline product. Preferably, said mixed metal compound pM has a polycrystalline structure. The mixed metal compound pM preferably comprises secondary particles formed by a plurality of agglomerated primary particles. The particle shape of the secondary particles of the mixed metal compound pM is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, the mixed metal compound pM is provided as spherical secondary particles that are agglomerates of primary particles. Even more preferably, the mixed metal compound pM is provided as spherical secondary particles that are agglomerates of spherical primary particles or platelets.

In a first preferred embodiment of the present invention, said mixed metal compound pM is provided on said support as one or more mixed metal compounds comprising lithium, e.g. comprised as lithium oxide, and having the general formula $Li_{1+a}M'_{1-a}O_2$, wherein a is from −0.5 to 0.5, preferably from −0.2 to 0.2, more preferably from −0.1 to 0.1, and most preferably from −0.05 to 0.05, and wherein M' is the cationic part of a mixed metal compound as described above.

In a second preferred embodiment of the present invention, said mixed metal compound pM is provided as a mixture ML, said mixture ML comprising one or more mixed metal compounds pM as described above and one or more lithium compounds L.

Preferably, said mixed metal compound pM is mixed with a lithium compound L in predetermined amounts prior to said heat treatment to form a mixture ML, and whereby a cathode active material according to the general formula $Li_{1+a}M'_{1-a}O_2$ is formed upon heat treatment of said mixture ML, wherein a is from −0.5 to 0.5, preferably from −0.2 to 0.2, more preferably from −0.1 to 0.1, and most preferably from −0.05 to 0.05, and wherein M' is the cationic part of a mixed metal compound as described above.

In one embodiment of the present invention, said mixed metal compound pM has the same composition of the heat treated mixed metal compound M as the desired electrode active material. In embodiments wherein pM in the mixed metal compound M is the same as in the desired electrode active material, the molar ratio of M' in the mixed metal compound pM to lithium in the lithium compound L is selected approximately in the desired range of the desired compound, for example in the range of 1:(1+a). In another embodiment of the present invention, said mixed metal compound M has a different composition of mixed metal compound pM. For example, the ratio of the two or more transition metals selected from Mn, Co and Ni is the same as in the desired electrode active material but element E is missing.

Before the heat treatment step of the inventive process, the mixed metal compound pM is mixed, preferably in a dry mixing step, with at least one lithium compound. Said lithium compound is preferably selected from $Li_2O$, $LiOH$, and $Li_2CO_3$, each as such or as a hydrate thereof, for example $LiOH \cdot H_2O$. Combinations of two or more of said lithium compounds are feasible as well. Examples of suitable apparatuses for mixing mixed metal compound pM and lithium compound are tumbler mixers, plough-share mixers and free fall mixers. After the heat treatment step of the inventive process, the particulate material can be easily removed from the support, and subjected to further process steps, for example cooling, sieving or combinations of crushing and sieving of the product.

In a preferred embodiment, the present invention provides a process according to the first aspect of the invention, whereby said mixture ML further comprises a compound selected from metal oxides, metal hydroxides and metal oxyhydroxides of Zr, Ti, W and especially Al.

Four-Stage Cooling Process

In an alternative or further aspect, the present invention provides a process for the preparation of a positive electrode material for lithium-ion batteries, starting from a lithiated precursor having a general formula of $Li_{1+a}M'_{1-a}O_2$, wherein −0.03≤a≤0.10, and M'=$Ni_xM''_yCo_zE_d$, wherein 0.30≤x≤0.92, 0.00 y≤0.40, 0.05≤z≤0.40, and 0≤d≤0.05, with M" being either one or both of Mn or Al, and with E being a dopant different from M", comprising the steps of:

sintering the precursor by heating it above a sintering temperature of at least 650° C.;

during a first cooling stage, cooling the sintered precursor to an intermediate temperature being the lower of 700° C. and the sintering temperature;

during a second cooling stage, cooling the sintered precursor from the intermediate temperature to 550° C. at a mean cooling rate of more than 2° C./min, preferably more than 5° C./min, and of less than 10° C./min;

during a third cooling stage, cooling the precursor from 550° C. to 200° C. at a mean cooling rate of more than 5° C./min, preferably more than 10° C./min; and, during a fourth cooling stage, cooling the precursor from 200° C. to ambient temperature.

The process described above may further comprise one or more additional stages during the cooling trajectory. The term "stage" is to be considered synonymous to the term "step," "phase" or "cycle." The mean cooling rate during a cooling stage is to be understood as the ratio of the temperature difference and the time difference for or period of that stage.

In typical cases, the sintering temperature will be well above 700° C., the first cooling stage being defined as from the sintering temperature down to 700° C. However, for certain specific material compositions, a sintering temperature of 650 to 700° C. may be adequate. The first cooling stage is then trivial in that it starts and stops at the sintering temperature.

It has been found that limiting the mean the cooling rate during the second cooling stage to less than 10° C./min is essential to ensure good electrochemical characteristics of the product. In addition, it is advantageous to keep the cooling rate constant, thus avoiding temporary excursions to higher cooling rates. It therefore preferred to maintain a cooling rate of less than 10° C./min, as measured during any 1-minute interval. It is even more preferred to maintain an instantaneous cooling rate of less than 10° C./min. This guarantees excellent electrochemical characteristics. The instantaneous cooling rate is to be understood as the cooling rate when measured during any arbitrarily short time interval.

The first cooling stage is advantageously performed at a mean rate of more than 5° C./min, preferably more than 10° C./min. This ensures that the total heat treatment time is minimized.

The third cooling stage is advantageously performed rapidly as this again helps minimizing the total heat treatment time. The product does not incur any degradation, even when rapidly cooled, as it is considered to be chemically and physically frozen when reaching 550° C.

The final cooling stage can be performed at any cooling rate. A high rate may be useful, but products cooled to 200° C. can be handled in any required way easily and without resorting to special apparatus or materials. There is thus no pressing need to rapidly cool the product down to room temperature.

A total cooling time from the intermediate temperature down to 200° C. of less than 110 minutes is considered adequate to match the goal of high product throughput. A total cooling time from the sintering temperature down to 200° C. of less than 110 minutes is preferred.

In the following detailed description, embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

The present invention covers a method for preparing a N(M)C based positive electrode material having a general formula of $Li_{1+a}M'_{1-a}O_2$, wherein $-0.03 \leq a \leq 0.10$, and $M'=Ni_xM''_yCo_zE_d$, wherein $0.30 \leq x \leq 0.92$, $0.00 \leq y \leq 0.40$, $0.05 \leq z \leq 0.40$, and $0 \leq d \leq 0.05$, with M" being either one or both of Mn or Al, and with E being a dopant different from M".

A N(M)C based positive electrode material can be prepared by various solid-state reaction including a single heating process, a double heating process as disclosed for instance in the patent publication WO 2017/042654 A1, or even a triple heating process. The triple heating process means that the process comprises three heating stages. The method according to the present invention should be applied after the last heating stage.

For example, when the double heating process is used, the cooling condition of the first heating is not critical because the compound from the first heating is heated again in the second heating at the temperature of at least 650° C.

Existing furnace technologies such as a conventional Roller Hearth Kiln (RHK) inherently lead to very slow cooling of the sintered product after sintering step. With new, more modern furnace technologies, fast cooling of the sintered product becomes feasible. This is attractive from the point of view of process efficiency, as shorter residence times generally also lead to higher throughput. It has however been found that fast cooling may lead to degraded electrochemical characteristics. This problem is solved by splitting the cooling path in a slow track and a fast track, according to this invention. This allows to retain good electrochemical characteristics while also minimizing the residence time.

It is discovered that the cooling rate between the lower of 700° C. and the sintering temperature to 550° C. (hereafter referred to as "CR2") is a critical parameter, which determines the electrochemical properties.

The following mechanisms are assumed to take place. Atoms such as Li and Ni actively change their sites in the crystal structure at high temperatures such as above 700° C. during sintering step of N(M)C manufacturing process. It can result in blocking the pathway of Li, leading to the decrease of reversible capacity in a battery. Ni on Li site (%) is a quantified parameter of the degree of cation exchange, obtained by an X-ray diffraction analysis. Generally, during cooling step, most of Li and Ni move back to their own sites. However, if the cooling rate is too high, such as more than 10° C./min, less Li and Ni kinetically can move back to their own sites. If CR2 is less than 10° C./min, Ni on Li sites can be minimized.

It was observed that the cooling rate below 550° C. does not affect electrochemical properties of N(M)C based positive electrode materials. Therefore, the cooling rate below 550° C. is allowed to be higher.

The mean cooling rate from 550° C. to 200° C. (hereafter referred to as "CR3") should preferably be more than 5° C./min, or even more than 10° C./min as this helps in obtaining the desired high throughput. Such a CR3 is much higher than typical natural cooling rates of around 2° C./min, so the total cooling time can be significantly reduced.

The cooling rate below 200° C. is relatively unimportant as temperatures of up to 200° C. are easily addressed in the next process steps such as crushing/milling process.

A process comprising multiple and well-controlled cooling steps requires a more sophisticated design of cooling unit. The hot sintered compound is transferred to a first cooling unit. In this unit, the sintered agglomerated compound is cooled down to 550° C. This unit can be a second RHK having faster roller speed with injection of cool air. The sintered compound is then transferred to a second cooling unit. In the second cooling unit, the sintered agglomerated compound is cooled down to 200° C. This unit can also be a third RHK with massive injection of cool air. The above example is not limitative. A rotary type of furnace having water-cooled walls could e.g. be substituted to replace the RHK of the second cooling unit.

The final product obtained by a process comprising the multiple cooling step in the present invention is a N(M)C based positive electrode material having a general formula of $Li_{1+a}M'_{1-a}O_2$, wherein $-0.03 \leq a \leq 0.10$, and $M'=Ni_xM''_yCo_zE_d$, wherein $0.30 \leq x \leq 0.92$, $0.00 \leq y \leq 0.40$, $0.05 \leq z \leq 0.40$, and $0 \leq d \leq 0.05$, with M" being either one or both of Mn or Al, and with E being either one or more than one of dopant different from M".

In a second aspect, the present invention provides in a secondary lithium-ion battery comprising a positive electrode active material obtained by a process according to the first aspect of the invention.

The following 2 assessment methods are used in the Examples.

1. Coin Cell Performance

For the preparation of a positive electrode, a slurry that contains a positive electrode material, conductor (Super P, Timcal), binder (KF#9305, Kureha)—with a formulation of 90:5:5 by weight—in a solvent (NMP, Mitsubishi) is prepared by a high-speed homogenizer. The homogenized slurry is spread on one side of an aluminium foil using a doctor blade coater with a 230 µm gap. The slurry-coated foil is dried in an oven at 120° C. and then pressed using a calendering tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as negative electrode. 1M LiPF$_6$ in EC/DMC (1:2) is used as electrolyte and is dropped between separator and electrodes. Then, the coin cell is completely sealed to prevent leakage of the electrolyte.

The coin cell performance is measured by a conventional "constant cut-off voltage" test. Each cell is cycled at 25° C. using a Toscat-3100 computer-controlled galvanostatic cycling station from Toyo. The coin cell testing procedure uses a 1C current definition of 160 mA/g. The coin cell is charged with 0.1 C until the voltage reaches 4.3 V. After 30 minutes, it is discharged at 0.1 C until the voltage reaches 3.0 V. This determines the discharge capacity DQ1 (mAh/g).

The discharge capacity is the preponderant quality parameter. For compositions according to $Li_{1+a}(Ni_{0.60}Mn_{0.20}Co_{0.20})_{1-a}O_2$, with 1.00 a 1.05, a good product is defined as having a discharge capacity of at least 176.0 mAh/g.

2. X-Ray Diffraction

The X-ray diffraction (XRD) pattern of the positive electrode material is collected with a Rigaku X-Ray Diffractometer (Ultima IV) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 158 mm. For the XRD, diffraction patterns are obtained in the range of 5-85° (2θ) with a scan speed of 1° per min and a step-size of 0.02° per scan. The crystallite sizes are calculated from the diffraction angle and the full width at half maximum (FWHM) of the peak of the (104) plane obtained from the X-ray diffraction pattern using the Scherrer equation:

$$\tau = \frac{K\lambda}{\beta\cos\theta}$$

with

τ: Crystallite size (nm), being the mean size of the ordered crystalline domains, which may be smaller or equal to the grain size;
κ: Scherrer constant, 0.9;
λ: X-ray wavelength Cuκα=1.5418 Å;
β: FWHM;
θ: XRD peak position, one half of 2θ.

The peak of the (104) plane assigned to a crystal structure with space group R-3m is observed at (around) 44.5±1° in an X-ray diffraction pattern. FWHM and 2θ of the peak of the (104) plane are obtained by using a Lorentz peak fitting function in Origin 9.1 software. Ni on Li (%) is obtained by a Rietveld refinement using the TO PAS 4.0 software.

A crystallite size between 40 and 50 nm, combined with a Ni on Li of less than 3.5% indicates that a synthesis results in a consistent and potentially acceptable product.

EXAMPLES

The invention is further exemplified in the examples provided hereunder.

Example EX1-01

The positive electrode material, EX1-01, is prepared by a double firing method as described in WO 18/158078 A, Manufacturing Example 3. The process comprises the following steps:

1) Preparation of metal bearing precursor: a metal bearing precursor (named MBP) having a general formula of $Ni_{0.60}Mn_{0.20}Co_{0.20}O_{0.17}(OH)_{1.83}$ is prepared by a co-precipitation process in a large scale continuous stirred tank reactor (CSTR) with mixed nickel-manganese-cobalt sulfates, sodium hydroxide, and ammonia.
2) First blending: to obtain a lithium deficient sintered precursor, $Li_2CO_3$ and the MBP are homogenously blended with a Li/M' molar ratio of 0.85, wherein M' is Ni, Mn, and Co.
3) First sintering: the mixture from the 1$^{st}$ blending step is sintered in a furnace at 800° C. for 2 hours of residence time.
4) Second blending: the lithium deficient sintered precursor from the first sintering is blended with LiOH·H$_2$O in order to correct the Li stoichiometry in the intermediate product to the final target composition of $Li_{1.017}(Ni_{0.60}Mn_{0.20}Co_{0.20})_{0.983}O_2$.
5) Second sintering: the mixture from the second blending step is sintered at 855° C. for 10 hours under dry air atmosphere in a furnace. The mean heating rate from 25° C. to 855° C. is 2.5° C./min.
6) Cooling: the sintered compound is naturally cooled down to 200° C. with a mean cooling rate of 2.5° C./min.
7) Post treatment: after the cooling step, the cooled sintered compound is crushed, classified, and sieved so as to obtain a non-agglomerated NMC powder.

Example EX1-02

The positive electrode material, EX1-02, is prepared by a double firing method as described in WO 18/158078 A, Manufacturing Example 3. The process comprises the following steps:

1) First blending: to obtain a lithium deficient sintered precursor, $Li_2CO_3$ and the MBP are homogenously blended with a Li/M' molar ratio of 0.725, wherein M' is Ni, Mn, and Co.
2) First sintering: the mixture from the first blending step is sintered in a furnace at 700° C. for 2 hours of residence time.
3) Second blending: the lithium deficient sintered precursor from first sintering is blended with LiOH·H$_2$O in order to correct the Li stoichiometry in the intermediate product to the final target composition of $Li_{1.017}(Ni_{0.60}Mn_{0.20}Co_{0.20})_{0.983}O_2$.

4) Second sintering: the mixture from the second blending step in an alumina crucible is sintered at 910° C. for 1 hours under dry air atmosphere in a chamber furnace. The mean heating rate from 25° C. to 910° C. is 2.5° C./min.

5) Cooling: the sintered compound is cooled down fast from 910° C. to 700° C. by a transportation of the alumina crucible into a second chamber furnace where the temperature is 700° C. The compound is then naturally cooled down from 700° C. to 550° C. in the second chamber furnace with a mean cooling rate of 4.4° C./min. When the temperature of the second chamber furnace reaches 550° C., the compound in the alumina crucible is poured on a copper metal block and it is pressed against another copper metal block as a quenching step. The mean cooling rate from 550° C. to room temperature is around 70° C./min.

6) Post treatment: the cooled sintered compound is crushed, classified, and sieved, so as to obtain a non-agglomerated NMC powder.

Example 2 and Comparative Example 2

The positive electrode materials having a formula of $Li_{1.005}(Ni_{0.60}Mn_{0.20}Co_{0.20})_{0.995}O_2$, EX2-01, EX2-02, CEX2-01, CEX2-02 and CEX2-03 are prepared by a single firing method. The process comprises the following steps:

1) Blending: $Li_2CO_3$ and the MBP are homogenously blended with a Li/M' molar ratio of 1.01, wherein M' is Ni, Mn, and Co.
2) Sintering: the mixture from the blending step in an alumina crucible is sintered at 860° C. for 10 hours under dry air atmosphere in a furnace. The mean heating rate from 25° C. to 860° C. is 2.5° C./min.
3) Cooling: The sintered agglomerated compound is naturally cooled down from 860° C. to a temperature $X_C$ according to Table 2. The mean cooling rate from 860° C. to $X_C$ is 4.4° C./min. When the temperature reaches $X_C$, the compound in the alumina crucible is poured on a copper metal block and it is pressed against another copper metal block as a quenching step.
4) Post treatment: the cooled sintered compound is crushed, classified, and sieved, so as to obtain a non-agglomerated NMC powder.

TABLE 1

Cooling condition and assessment of samples in Example 1-01 and Example 1-02.

| | Cooling conditions | | | XRD | | |
|---|---|---|---|---|---|---|
| Sample ID | CR2 ° C./ min | CR3 ° C./ min | Total cooling min | Crystallite size nm | Ni on Li % | Coin cell DQ1 mAh/g |
| EX1-01 | 2.5 | 2.5 | 262 | 48 | 2.7 | 176.0 |
| EX1-02 | 4.4 | 70 | 44 | 46 | 3.2 | 176.4 |

Table 1 shows the cooling conditions and assessment of the samples prepared according to Example 1-01 and Example 1-02. CR2 is the mean cooling rate from 700° C. to 550° C., and CR3 is the mean cooling rate from 550° C. to 200° C. Due to relatively faster CR2 and very fast CR3 of the process for EX1-02, the total cooling time is significantly reduced. In spite of relatively high Ni on Li of EX1-02, the discharge capacity of EX1-02 is comparable to EX1-01. Therefore, it is proven that the cooling time can be reduced without scarifying the electrochemical performance.

TABLE 2

Cooling condition and assessment of samples in Comparative Example 2 and Example 2.

| | | Cooling conditions | | | XRD | | |
|---|---|---|---|---|---|---|---|
| Sample ID | $X_C$ ° C. | CR2 C./ °min | CR3 ° C./ min | Total cooling min | Crystallite size nm | Ni on Li % | Coin cell DQ1 mAh/g |
| CEX2-01 | 850 | 130 | 130 | 16 | 44 | 3.6 | 170.9 |
| CEX2-02 | 750 | 110 | 110 | 39 | 45 | 3.7 | 172.3 |
| CEX2-03 | 650 | 12 | 90 | 62 | 44 | 3.7 | 175.2 |
| EX2-01 | 550 | 4.4 | 70 | 85 | 44 | 2.9 | 177.8 |
| EX2-02 | 100 | 4.4 | 1.7 | 285 | 44 | 2.6 | 177.6 |

Table 2 show the cooling conditions and assessment of the samples prepared according to Comparative Example 2 and Example 2. CR2 is the mean cooling rate from 700° C. to 550° C., and CR3 is the mean cooling rate from 550° C. to 200° C.

According to Example EX-01 and EX2-02 good products are obtained. However, the total cooling times amount to respectively 262 and 285 minutes, which is less preferred. This is due to the too low cooling rates applied.

CEX2-01 and CEX2-02, and CEX2-03 are cooled too rapidly in the critical region between 700 and 550° C., and consequently deliver poor products. More particularly, CEX2-01 and CEX2-02 are cooled from respectively 850° C. and 750° C. to 200° C. at a rate of respectively 130 and 110° C./min; and CEX2-03 is cooled from 650° C. to 200° C. at a rate of 90° C./min.

Examples EX1-02 and EX2-01 are also according to the invention. More particularly, EX1-02 is cooled rapidly from 900° C., i.e. the sintering temperature, to 700° C., and then at a suitable rate of 4.4° C./min in the critical region between 700 and 550° C.; and EX2-01 is cooled from 860° C., i.e. the sintering temperature, to 550° C., at a rate of 4.4° C./min, thus also ensuring a suitable rate in the critical region between 700 and 550° C.

The invention claimed is:

1. A process for preparing a positive electrode material for lithium-ion batteries comprising the steps of:
   subjecting a mixed metal compound pM comprising nickel and at least one metal selected from cobalt, manganese and aluminium to a heat treatment at a temperature $T_S$ of at least 650° C., thereby obtaining a heat-treated mixed metal compound M;
   in a first cooling stage, cooling said heat-treated mixed metal compound M, at mean cooling rate, to an intermediate temperature $T_I$ being the lower of 700° C. and the sintering temperature $T_S$;
   in a second cooling stage, cooling said heat-treated mixed metal compound M from said intermediate temperature $T_I$ to 550° C. at a mean cooling rate of more than 2° C./min and of less than 10° C./min, wherein the mean cooling rate of the first cooling stage is more than the mean cooling rate of the second cooling stage; and
   in a final cooling stage, cooling said heat-treated mixed metal compound M, at a mean cooling rate of at least 70° C./min, to ambient temperature, thereby obtaining a positive electrode material for lithium-ion batteries.

2. The process according to claim 1, whereby said mixed metal compound pM is sintered by heating to a sintering temperature $T_S$ between 750° C. and 1050° C.

3. The process according to claim 1, wherein the second cooling stage is performed at a cooling rate of less than 10° C./min as measured during any 1-minute interval.

4. The process according to claim 1, wherein the second cooling stage is performed at an instantaneous cooling rate of less than 10° C./min.

5. The process according to claim 1, whereby said heat treatment further comprises a third cooling stage, whereby said heat-treated mixed metal compound M is cooled from a temperature between 550° C. and 400° C. to a temperature between 250° C. and 100° C.

6. The process according to claim 1, whereby in said second cooling stage, said heat-treated mixed metal compound M is cooled from said intermediate temperature $T_I$ to 550° C. at a mean cooling rate of 2.5° C./min or more.

7. The process according to claim 1, whereby said mixed metal compound M is a lithiated precursor having a general formula of $Li_{1+a}M'_{1-a}O_2$, wherein $-0.03 \leq a \leq 0.10$, and $M'=Ni_x M'_y Co_z E_d$, wherein $0.30 \leq x \leq 0.92$, $0.00 \leq y \leq 0.40$, $0.05 \leq z \leq 0.40$, and $0 \leq d \leq 0.05$, with M" being either one or both of Mn or Al, and with E being a dopant different from M", comprising the steps of:

sintering the precursor by heating it above a sintering temperature of at least 650° C.;

during a first cooling stage, cooling the sintered precursor to an intermediate temperature being the lower of 700° C. and the sintering temperature;

during a second cooling stage, cooling the sintered precursor from the intermediate temperature to 550° C. at a mean cooling rate of more than 2° C./min and of less than 10° C./min;

during a third cooling stage, cooling the precursor from 550° C. to 200° C. at a mean cooling rate of more than 10° C./min; and, during a fourth cooling stage, cooling the precursor from 200° C. to ambient temperature.

8. The process according to claim 7, wherein the second cooling stage is performed at a cooling rate of less than 10° C./min as measured during any 1-minute interval.

9. The process according to claim 7, wherein the second cooling stage is performed at an instantaneous cooling rate of less than 10° C./min.

10. The process according to claim 7, wherein the first cooling stage is performed at a mean cooling rate of more than 10° C./min.

11. The process according to claim 7, whereby $0.60 \leq x \leq 0.95$.

12. The process according to claim 1, whereby the cooling rate at any time during said second cooling stage is ±10% of said mean cooling rate during said second cooling stage.

* * * * *